United States Patent Office 2,927,116
Patented Mar. 1, 1960

2,927,116

CHLOROBENZIMIDAZOLONE COMPOUNDS

John Davoll, Shepperton, and Dennis H. Laney, Lewisham, London, England, assignors to Parke, Davis & Company, Detroit, Mich., a corporation of Michigan No Drawing. Application March 19, 1958
Serial No. 722,383

Claims priority, application Great Britain April 11, 1957

6 Claims. (Cl. 260—309.2)

This invention relates to novel benzimidazolone compounds and to means of producing the same. More particularly, the invention relates to chlorobenzimidazolone compounds having the formula,

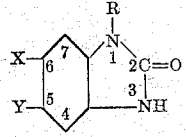

wherein R is an ethyl or allyl group and X and Y represent hydrogen or chlorine radicals in the combination 5-chloro, 6-chloro or 5,6-dichloro.

In accordance with the invention these compounds are produced by reacting a phenylenediamine compound having the formula,

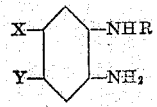

with a carbonic acid derivative such as a dialkyl carbonate, an alkyl, aralkyl or aryl chloroformate, a urea, phosgene, an alkyl, aralkyl or aryl isocyanate or urethane, a dialkyliminocarbonate and the like; wherein R, X and Y have the aforementioned significance. At least one equivalent of the carbonic acid derivative is ordinarily employed. If desired, an excess of either of the reactants may be employed but it is preferable from the standpoint of maximum yields to employ the carbonic acid derivative in excess. In general, the reaction is carried out at temperatures in excess of about 75° C., preferably in an aqueous or non-aqueous solvent. In the case of reaction with phosgene temperatures in the range of 80 to 100° C. are preferred whereas temperatures as high as 170° C. are preferred in the case of the ureas. Although the reaction proceeds in either acidic, neutral or basic media, the use of at least one equivalent of a basic catalyst such as an alkali metal alkoxide is preferred when employing as the carbonic acid derivative either a carbonate, urethane or chloroformate.

In another embodiment, the invention is carried out by cyclizing a phenylenediamine compound having the formula,

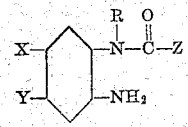

in a suitable organic solvent at elevated temperature in the presence of a basic catalyst; wherein R, X and Y have the aforementioned significance and Z represents an alkoxy, amino or substituted amino group. The reaction is preferably carried out in an alcoholic type solvent. Some examples of such solvents are methanol, ethanol, n-propanol, isopropanol and the like. Temperatures in excess of 75° C. are preferred and for the best results the reaction mixture is maintained at reflux temperature. As basic catalysts, the alkali metal alkoxides such as sodium methoxide, sodium ethoxide and sodium isopropoxide are preferred.

A special method for the production of the compounds of the invention comprises subjecting a 1-isopropenyl-chlorobenzimidazolone having the formula,

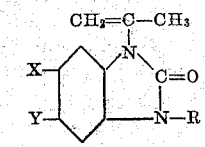

to acid hydrolysis in the presence of a suitable solvent; where R, X and Y have the aforementioned significance. Although various acids may be employed for the hydrolysis, use of mineral acids, particularly hydrochloric acid, is preferred. Among the many solvents which are suitable are the alkoxyalkanols such as 2-ethoxyethanol, ketones such as acetone, ethers such as diethyl ether, dioxane and the like, and alcohols such as methanol and ethanol. The hydrolysis proceeds favorably over a wide range of temperature and is not critical in this respect. Preferably, the reaction is carried out at the reflux temperature of the reaction mixture. Lower temperature can be employed although in this case the reaction ordinarily requires longer periods of time for completion.

The novel compounds of the invention when administered orally possess the ability to inhibit the transfer of energy between nerve centers and hence are useful as internuncial depressants and muscle relaxants.

The invention is illustrated by the following examples.

*Example 1*

5-chloro-$N^1$-ethylphenylene-1,2-diamine (300 g.), 2.1 liters of toluene, 450 ml. of ethyl carbonate and 180 g. of sodium methoxide are cautiously heated together in a 5-liter flask fitted with a powerful stirrer and a column with a take-off head. When the oil-bath temperature reaches 120° C., a vigorous distillation of methanol-toluene and ethanol-toluene azeotropes occurs. As the reaction subsides, an additional 214 g. of 5-chloro-$N^1$-ethyl-phenylene-1,2-diamine are added to the reaction mixture. When a portion (about 200 ml.) of distillate has been collected, the contents of the flask tend to solidify in which case the contents are conveniently broken up in order to facilitate stirring. Over a four-and-one-half hour period, the oil-bath temperature is raised to 170° C., and a total of approximately 610 ml. of distillate is collected below 80° C. After cooling, the mass is treated with a mixture of 1.5 liters of water and 200 ml. of glacial acetic acid at 80° C. After stirring for one hour, 3 liters of light petroleum are added and the mixture kept at 0° C. for two hours. The product, 6-chloro-1-ethylbenzimidazolone, is removed by filtration, washed with water and light petroleum and dried. After recrystallization from ethyl acetate the product melts at 184–185° C.

The starting material, 5-chloro-$N^1$-ethylphenylene-1,2-diamine, can be prepared by reacting 2,4-dichloronitro-benzene with ethylamine and subjecting the resultant 5-chloro-2-nitro-N-ethylaniline to reduction in an aqueous acidic medium containing iron powder. A detailed description of the preparation of this starting material follows:

A mixture consisting of 2.25 kg. of 2,4-dichloronitro-benzene, 8.4 liters of 2-ethoxyethanol and 2 liters of 70% aqueous ethylamine is heated on a steam bath under a pressure of 50 mm. (Hg) above atmospheric pressure. After a total of seven hours heating time, the mixture is cooled and the reaction product, 5-chloro-2-nitro-N-ethylaniline, is collected by filtration and washed with ethanol. A suspension of 400 g. of iron powder in one liter of water is stirred vigorously and heated until reflux begins. 100 ml. of concentrated hydrochloric acid is added during this period and then 400 g. of 5-chloro-2-nitro-N-ethylaniline is added as a solid over a period of 1 and one-half hours; bath temperature is kept at about 130° C. Stirring and refluxing are continued until the color of the refluxing liquid changes from yellow to brown. Approximately 150 ml. of ethanol is added toward the end of the reaction to wash down any unreacted nitro compounds which might remain. The reaction mixture is neutralised to Congo red with aqueous sodium bicarbonate solution, and cooled. The reaction mixture is treated with 400 ml. of chloroform, filtered and the solid washed with two parts of 200 ml. of chloroform. The chloroform filtrates are dried over magnesium sulfate. The magnesium sulfate is removed and the chloroform evaporated to give 5-chloro-$N^1$-ethylphenylene-1,2-diamine sufficiently pure for further use. Small quantities may be distilled; boiling point 124° C. (1 mm., Hg).

Example 2

A mixture of 5-chloro-$N^1$-carbethoxy-$N^1$-ethylphenylenediamine (conveniently prepared by reacting 188 g. of 5-chloro-N-ethyl-2-nitroaniline with ethyl chloroformate and hydrogenating the resultant 5-chloro-2-nitro-N-carbethoxy-N-ethylaniline) and a solution of sodium ethoxide prepared from 40 g. of sodium and 1.2 liters of absolute ethanol is heated at reflux temperature for seven hours, cooled, diluted with 800 ml. of water and filtered through diatomaceous earth. The filtered mixture is acidified with 175 ml. of concentrated hydrochloric acid. The product which separates is 6-chloro-1-ethylbenzimidazolone; M.P. 184–185° C. after recrystalization from ethyl acetate.

Example 3

A mixture of 99 g. of $N^1$-allyl-5-chlorophenylene-1,2-diamine (conveniently prepared by subjecting N-allyl-5-chloro-2-nitroaniline to reduction in an aqueous acidic medium containing iron powder), 65 g. of urea, and 400 ml. of 2-butoxyethanol is heated at reflux temperature for three hours, cooled and 2 liters of water added. The supernatant liquid is decanted and the semi-solid residue is stirred with 1.5 liters of light petroleum (B.P. 60 to 80° C.). The resulting crystalline 1-allyl-6-chlorobenzimidazolone is collected and washed with light petroleum; after recrystallization from ethyl acetate the product melts at 173–175° C.

Example 4

A mixture of 156 g. of N-allyl-4,5-dichlorophenylene-1,2-diamine, 90 g. of urea and 400 ml. of 2-butoxyethanol is heated under reflux for one and one-half hours. Water (1.35 liters) is added and the solid product, 1-allyl-5,6-dichlorobenzimidazolone, is collected, pressed free of oily material and washed with water and light petroleum; M.P. 196–198° C. after recrystallization from ethyl acetate.

The starting material, N-allyl-4,5-dichlorophenylene-1,2-diamine, can be prepared by reacting 2,4,5-trichloronitrobenzene with allylamine and subjecting the resultant N-allyl-4,5-dichloro-2-nitroaniline to reduction in an aqueous acidic medium containing iron powder.

Example 5

A mixture consisting of 65 g. of 4,5-dichloro-N-ethylphenylene-1,2-diamine, 36 g. of urea and 180 ml. of 2-butoxyethanol is heated at reflux temperature for one hour. The reaction mixture is cooled and 600 ml. of water is added. The solid product, 5,6-dichloro-1-ethylbenzimidazolone, is collected, pressed free of oily material and recrystallized from ethyl acetate; M.P. 205–207° C.

The starting material, 4,5-dichloro-N-ethylphenylene-1,2-diamine, can be prepared by reacting 2,4,5-trichloronitrobenzene with ethylamine and subjecting the resultant 4,5-dichloro-N-ethyl-2-nitroaniline to reduction in an aqueous acidic medium containing iron powder.

Example 6

A mixture consisting of 16.6 g. of 4,5-dichloro-N-ethyl-2-nitroaniline and 28 ml. of butyl chloroformate is heated at reflux temperature for three hours. Ethanol (30 ml.) is added and the solvents are removed by evaporation under reduced pressure. The residue is dissolved in 200 ml. of ethanol and hydrogenated at 18 to 23° C. with a hydrogen pressure of one atmosphere and with 0.4 g. of platinum oxide catalyst, the theoretical amount of hydrogen absorbed being 5.3 liters. The reaction mixture is filtered, the filtrate is evaporated under reduced pressure, and a solution of 3.3 g. of sodium in 150 ml. of 2-ethoxyethanol is added to the residue. The mixture is heated under reflux temperature for five hours, diluted with 300 ml. of water and then acidified with concentrated hydrochloric acid. The product, 5,6-dichloro-1-ethylbenzimidazolone, is removed by filtration and recrystallized from aqueous ethanol; M.P. 207–208° C.

Example 7

A mixture consisting of 3.54 g. of 4,5-dichlorophenylene-1,2-diamine, 2.6 g. of ethyl acetoacetate, 50 ml. of benzene and one drop of concentrated hydrochloric acid is heated to boiling for thirty minutes, during which time 15 ml. of benzene are removed. The residue, after removal of the solvent under reduced pressure, is refluxed for two hours with a solution of 0.46 g. of sodium and 20 ml. of 2-ethoxyethanol. The reaction mixture, containing 5,6-dichloro-1-isopropenylbenzimidazolone, is cooled, 3.63 g. of allyl bromide is added and the mixture is heated to reflux temperature for one hour. The reaction mixture, containing 3-allyl-5,6-dichloro-1-isopropenylbenzimidazolone, is cooled, mixed with 0.5 ml. of concentrated hydrochloric acid and again heated to reflux temperature for five minutes. The mixture is added to 150 ml. of water and the material which separates is washed with water, dried, and extracted with 35 ml. of hot ethyl acetate. On cooling, the crystalline product, 1-allyl-5,6-dichlorobenzimidazolone, is isolated by filtration and dried; M.P. 197–198° C.

Example 8

93 grams of 4-chloro-$N^1$-carbethoxy-$N^1$-ethylphenylene-1,2-diamine and a solution of 12.5 g. of sodium in 450 ml. of ethanol are heated at reflux temperature for four and one-half hours. The reaction mixture is cooled, added to 1400 ml. of water and acidified with 38 ml. of concentrated hydrochloric acid. The solid product, 5-chloro-1-ethylbenzimidazolone, is collected by filtration and recrystallized from ethyl acetate; 167–169° C.

We claim:
1. Chlorobenzimidazolone compounds of formula,

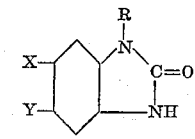

where R is a member of the class consisting of ethyl and allyl and X and Y are members of the class consisting of hydrogen and chlorine atoms, at least one of X and Y being a chlorine atom.
2. 5-chloro-1-ethylbenzimidazolone.
3. 6-chloro-1-ethylbenzimidazolone.
4. 5,6-dichloro-1-ethylbenzimidazolone.
5. 6-chloro-1-allylbenzimidazolone.
6. 5,6-dichloro-1-allylbenzimidazolone.

References Cited in the file of this patent

Hartmann: Ber. Deut. Chem., vol. 23, pp. 1046–8 (1890).

Fischer et al.: Beil. (Handbuch, 4th ed.) vol. 24, p. 119 (1936).

Feitelson et al.: Chem. Abst., vol. 47, col. 1133 (1953).

Tamm et al.: Chem. Abst., vol. 50, col. 14046 (1956).